(12) United States Patent
Vandor (10) Patent No.: US 8,063,511 B2
(45) Date of Patent: *Nov. 22, 2011

(54) SYSTEM AND METHOD FOR LIQUID AIR PRODUCTION, POWER STORAGE AND POWER RELEASE

(75) Inventor: David Vandor, Tarrytown, NY (US)

(73) Assignee: Expansion Energy, LLC, Tarrytown, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/906,919

(22) Filed: Oct. 18, 2010

(65) Prior Publication Data

US 2011/0030332 A1    Feb. 10, 2011

Related U.S. Application Data

(63) Continuation-in-part of application No. 12/406,754, filed on Mar. 18, 2009, now Pat. No. 7,821,158, which is a continuation-in-part of application No. 12/127,520, filed on May 27, 2008, now Pat. No. 7,870,746.

(51) Int. Cl.
    *F25J 1/00* (2006.01)
(52) U.S. Cl. .......................................... 307/64; 307/68
(58) Field of Classification Search .............. 307/64–68; 62/615, 50.2, 50.3, 87; 60/651, 652, 648, 60/727, 728, 39.01, 39.461
    See application file for complete search history.

(56) References Cited

U.S. PATENT DOCUMENTS 2,760,356 A    8/1956  Sixsmith
(Continued)

FOREIGN PATENT DOCUMENTS

WO    WO 2007-096656    8/2007

OTHER PUBLICATIONS

Vandor, David; Dockter, Jeremy, "The VPS Cycle: A System and Method for Power Storage and Release;" Report, dated Oct. 2008.

(Continued)

*Primary Examiner* — Fritz M Fleming
(74) *Attorney, Agent, or Firm* — Eric L. Lane; Luce, Forward, Hamilton & Scripps, LLP (57) ABSTRACT

Systems and methods for storing and releasing energy comprising directing inlet air into a vertical cold flue assembly, a portion of moisture being removed from the air within the cold flue assembly. The air is directed out of the cold flue assembly and compressed. The remaining moisture is substantially removed and the carbon dioxide is removed from the air by adsorption. The air is cooled in a main heat exchanger such that it is substantially liquefied using refrigerant loop air. The substantially liquefied air is directed to a storage apparatus. The refrigerant loop air is cooled by a mechanical chiller and by a plurality of refrigerant loop air expanders. In energy release mode, working loop fluid warms the released liquid air such that the released liquid air is substantially vaporized, and the released liquid air cools the working loop fluid such that the working loop fluid is substantially liquefied. A portion of the released liquid air is directed to the at least one generator and used as bearing air for the at least one generator. The substantially vaporized air is directed to a combustion chamber and combusted with a fuel stream. Combustion gas may be directed from the combustion chamber to at least one expander, the expanded combustion gas split into two portions. The first portion may be directed to a first heat exchanger, and the second portion may be directed to a second heat exchanger such that the second portion heats and substantially vaporizes the released liquid air.

20 Claims, 2 Drawing Sheets

U.S. PATENT DOCUMENTS

| | | | |
|---|---|---|---|
| 3,631,673 A * | 1/1972 | Charrier et al. | 60/39.183 |
| 3,742,716 A | 7/1973 | Backstrom | |
| 3,757,517 A | 9/1973 | Rigollot | |
| 4,329,842 A * | 5/1982 | Hoskinson | 60/39.465 |
| 4,437,312 A | 3/1984 | Newton et al. | |
| 4,455,834 A | 6/1984 | Earle | |
| 4,461,154 A | 7/1984 | Allam | |
| 4,754,607 A * | 7/1988 | Mackay | 60/723 |
| 5,123,946 A | 6/1992 | Ha | |
| 5,495,709 A | 3/1996 | Frutschi | |
| 5,537,822 A | 7/1996 | Shnaid et al. | |
| 5,626,019 A | 5/1997 | Shimizu et al. | |
| 5,666,823 A * | 9/1997 | Smith et al. | 62/646 |
| 5,907,959 A | 6/1999 | Agrawal et al. | |
| 6,920,759 B2 | 7/2005 | Wakana et al. | |
| 7,464,557 B2 | 12/2008 | Vandor | |
| 7,821,158 B2 * | 10/2010 | Vandor | 307/64 |
| 7,870,746 B2 | 1/2011 | Vandor | |
| 2001/0004830 A1 | 6/2001 | Wakana et al. | |
| 2005/0198961 A1 | 9/2005 | Shirk et al. | |
| 2006/0254287 A1 | 11/2006 | Greenberg et al. | |
| 2006/0260312 A1 | 11/2006 | Ingersoll | |
| 2007/0186563 A1 | 8/2007 | Vandor et al. | |
| 2008/0047271 A1 | 2/2008 | Ingersoll | |
| 2008/0216510 A1 | 9/2008 | Vandor et al. | |
| 2009/0113928 A1 | 5/2009 | Vandor et al. | |
| 2009/0226308 A1 | 9/2009 | Vandor | |
| 2009/0293502 A1 | 12/2009 | Vandor | |
| 2009/0293503 A1 | 12/2009 | Vandor | |
| 2010/0084256 A1 | 4/2010 | Vandor | |

OTHER PUBLICATIONS

Vandor, David and Dockter, Jeremy, "Efficiency of Expansion Energy's "VSP Cycle" Utility-Scale Power Storage System", Article, dated Aug. 8, 2008.

Vandor, David and Dockter, Jeremy, U.S. "Utility-Scale Power Storage System," Article, dated Jul. 21, 2008.

Chino, K., Araki H., "Evaluation of Energy Storage Method Using Liquid Air", abstract of journal article, dated 1999.

* cited by examiner

SYSTEM AND METHOD FOR LIQUID AIR PRODUCTION, POWER STORAGE AND POWER RELEASE

CROSS-REFERENCE TO RELATED APPLICATIONS

This application is a continuation-in-part of U.S. patent application Ser. No. 12/406,754, filed on Mar. 18, 2009, now U.S. Pat. No. 7,821,158, which is a continuation-in-part of U.S. patent application Ser. No. 12/127,520, filed on May 27, 2008, now U.S. Pat. No. 7,870,746, each of which is incorporated herein by reference in its entirety.

FIELD OF THE INVENTION

The present invention relates to power storage and release systems and methods.

BACKGROUND OF THE INVENTION

Wind power is desirable because it is renewable and typically cleaner than fossil fuel power sources. Wind turbines capture and convert the energy of moving air to electric power. However, they do so unpredictably and often during low power demand periods when the value of electric power is substantially lower than during peak demand periods. Without a way to achieve certainty of delivery during peak demand periods (also known as "firm" power), and without a way to store low-value off-peak power for release during high-value peak periods, the growth of wind power and other intermittent renewable power sources may be constrained, keeping it from reaching its full potential as part of the world's overall power generation portfolio.

Another disadvantage of intermittent power sources such as wind is that they can cause system "balance" problems if allowed onto the transmission grid, which is a major hurdle for new (particularly renewable) power generation sources to clear. Operating wind turbines (or other intermittent renewable power assets) adjacent to and in conjunction with a natural gas-(NG) fired turbine can yield 100% certainty of power, because the NG turbine can "back up" the wind. However, that approach will yield a reduced environmental rating, based on the hours of operation for the NG turbine and may be economically unfeasible because the two power output systems need to be fully redundant, and thus capacity utilization and economic return-on-assets is diminished. Most importantly, neither a standard wind farm nor a back-up NG turbine(s) can "store" the wind power that may be widely available during the off-peak periods.

A disadvantage of other types of utility-scale power sources is that they produce large and unnecessary amounts of power during off-peak periods or intermittently. Another major disadvantage of existing power systems, both firm and intermittent, is that transmission lines often become "clogged" or overloaded, and transmission systems can become unbalanced. One existing solution for overloaded transmission lines is transferring power by "wheeling," which is the delivery of a specific quantity of power to each end-user, allowing any "power product" to enter the power transmission system and be used to "balance" any other product that was removed from the system. A disadvantage of using current storage systems for wheeling is that power production occurs during all hours (most of which are not peak demand hours), and does not substantially overlap with peak demand hours. Another disadvantage is that transmission of power, which occurs at all hours (most of which are not peak demand hours), also does not substantially overlap with peak demand hours.

The few utility-scale power storage systems that exist today (or have been proposed previously) also have major disadvantages such as inefficient heat and cold recovery mechanisms, particularly those that require multiple systems for hot and cold storage media. Another disadvantage is extra complexity in the form of many expanders and compressors often on the same shaft with "clutches" that allow some front-end elements to be disconnected from the back-end elements on the same shaft. Some existing power plants use a simple cycle gas turbine with a recuperator, where a front-end compressor is on the same shaft as the hot-gas expander that compresses the inlet air. However, in that configuration some 63% of the power output is devoted to compressing inlet air.

Therefore, there exists a need for a system that can provide certainty and a firm, consistent energy output from any power source, particularly intermittent power sources such as wind. There is also a need to provide a convenient storage system for power that can be used in connection with power generation sources that generate large amounts of power during off-peak periods, including both firm (i.e., baseload) and intermittent power sources. There is a further need for a power storage and release assembly having more efficient hot and cold recovery mechanisms and simpler, more efficient, compression and expansion systems.

SUMMARY OF THE INVENTION

The present invention, in its many embodiments, alleviates to a great extent the disadvantages of known power storage systems by converting energy to liquid air (L-Air) for power storage and release and using the L-Air and ambient air for heat exchange purposes. All of the cold from released L-Air is recovered by a working loop of air for greater energy output. Embodiments of the present invention provide energy efficient storage, replacement and release capabilities by cooling and warming air through heat exchange, recovering both heat and cold from the system, storing energy as liquid air and pumping liquid air to pressure to release energy.

Embodiments of the present invention may be referred to herein as Vandor's Power Storage (VPS) Cycle. The VPS Cycle includes systems and methods of storing power and systems and methods of energy release. An embodiment of the VPS Cycle's method of storing power comprises directing inlet air through a vertical cold flue assembly having an air inlet at or near its top into which the inlet air is directed and an exit point at or near its bottom. The inlet air sinks downward from the top of the cold flue assembly to the bottom of the cold flue assembly. The storage method further includes the steps of cooling the air within the cold flue assembly and removing a portion of the moisture from the air within the cold flue assembly. The cold flue assembly includes an insulated aluminum plate fin heat exchanger configured to operate in a vertical manner (with the plates in an optimum, such as concentric circle, arrangement) so that the entire assembly resembles (in a horizontal cross sectional or plan view) a round "flue." Although use of the cold flue assembly is preferred, an ordinary plate fin heat exchanger in a horizontal configuration could be used in the power storage methods.

The air is directed out the exit of the cold flue assembly. Then the air is compressed and the heat of compression recovered from the compressed air. Preferably, compression of the air includes two-stages of compression where the air is first compressed to a first pressure at this stage of the cycle and the heat of compression recovered from the compressed air. The recovered heat of compression from the compressed air may be directed to an absorption chiller to drive the absorption chiller. The absorption chiller is fluidly connected to the cold flue assembly. Refrigerant may be directed from the absorption chiller to the cold flue assembly to help cool the inlet air entering the cold flue assembly. The remaining moisture and carbon dioxide ($CO_2$) are removed from the air by adsorption, preferably using a molecular sieve assembly.

Next, in a preferred embodiment, the air is compressed to a second pressure and the heat of compression is again recovered from the compressed air. It should be noted that the compression could be performed in a single stage with some loss of efficiency or in three or more stages with efficiency gains but increased complexity and capital costs. A preferred embodiment of the storage method next comprises cooling the air in a main heat exchanger such that the air is substantially liquefied using refrigerant loop air, the refrigerant loop air generated by a refrigerant loop process. Finally the substantially liquefied air is directed to a storage apparatus, preferably a liquid air storage tank.

A vapor portion of the substantially liquefied air in the storage apparatus, or "flash air" may be directed to the main heat exchanger, and recovered cold from the vapor portion used to further cool the inlet air flowing in. This vapor portion would thus be warmed by the inlet air. The vapor portion is further warmed, preferably to approximately 220° F. and specifically by the heat of compression recovered from elsewhere in the process. The warmed vapor portion of the substantially liquefied air is directed to the molecular sieve assembly so that the substantially liquefied air removes the carbon dioxide and moisture that had been collected there. The warm sweep air, which is still at nearly the 70 psia pressure at which it left the storage tank as flash air, moves on to a generator-loaded hot-gas expander, producing power that is used on-site to run some of the instruments, valves, pumps and other such devices, and thus improving the relationship between the total amount of power delivered for storage to the system and the amount of L-Air that results from that power. (This is called "sweeping" the molecular sieve assembly; thus, the warmed vapor portion of the substantially liquefied air directed to the molecular sieve assembly is also referred to as "sweep air" herein.).

The storage method also preferably comprises compressing a refrigerant loop air stream to a first pressure, while recovering the heat of compression, then compressing the refrigerant loop air to a second and optionally a third pressure and again recovering the heat of compression. The refrigerant loop air is then split so that a first portion is directed to a mechanical chiller and a second portion is directed to a refrigerant loop air cryogenic expander. The refrigerant loop air is then cooled in the mechanical chiller and the refrigerant loop air cryogenic expander and directed back to the main heat exchanger, where it is further cooled and then expanded to further cool the stream. The refrigerant loop air then is returned to the main heat exchanger as the deeply cooled refrigerant stream that cools the inlet air to be liquefied. Refrigerant may be directed from the absorption chiller to the mechanical chiller to cool the mechanical chiller. Returning to the refrigeration cycle, the refrigerant air stream is warmed by the inlet air and is returned to the beginning of the loop where it is recompressed and chilled again, as outlined above.

An embodiment of an energy storage system comprises one or more inlet air compressors. A single multi-stage compressor or a plurality of compressors may be used to compress the inlet air that is to be liquefied and stored, depending on the desired configuration. The system may also comprise a molecular sieve assembly fluidly connected to a first inlet air compressor. In a preferred embodiment, a vertical cold flue assembly is fluidly connected to the molecular sieve assembly and to a second inlet air compressor and has an air inlet at or near its top into which the inlet air is directed and an exit at or near its bottom. The cold flue assembly preferably consists of a plate fin heat exchanger and has an air inlet at or near its top into which the inlet air is directed and an exit at or near its bottom.

An absorption chiller using working fluid is fluidly connected to the cold flue assembly. The energy storage system also comprises one or more heat exchangers including a main heat exchanger, preferably a cryogenic heat exchanger, fluidly connected to at least one of the one or more inlet air compressors. The assembly further comprises a storage apparatus fluidly connected to the main heat exchanger. A mechanical chiller containing refrigerant fluid is fluidly connected to the absorption chiller, and a refrigerant loop air assembly is fluidly connected to the mechanical chiller.

In a preferred embodiment, the refrigerant loop air assembly comprises one or more refrigerant loop air compressors and one or more refrigerant loop air cryogenic expanders, with at least one of the compressors being fluidly connected to the main heat exchanger. The mechanical chiller is fluidly connected to at least one refrigerant loop air compressor, to at least one refrigerant loop air expander, to the absorption chiller and to the main heat exchanger. In this embodiment, the refrigerant loop air flows from the refrigerant loop air assembly to the main heat exchanger to cool and liquefy the inlet air.

In a preferred embodiment of the refrigerant loop process, the air stream flows through a connected loop from an independent refrigeration assembly comprising a plurality of refrigerant loop air compressors which compress the refrigerant loop air such that the refrigerant loop air is compressed to a first pressure and the heat of compression is recovered. The refrigerant loop air is compressed to a second pressure and the heat of compression is recovered. The refrigerant loop air is split such that a first portion is directed to the mechanical chiller and a second portion is directed to at least one refrigerant loop air cryogenic expander. The refrigerant loop air is cooled by the mechanical chiller and by the one or more refrigerant loop air cryogenic expanders. The refrigerant within the mechanical chiller is condensed by cold working fluid sent to the mechanical chiller from the absorption chiller.

An embodiment of an energy release system comprises a storage apparatus and one or more heat exchangers wherein at least one of the heat exchangers is fluidly connected to the storage apparatus. At least one combustion chamber is fluidly connected to at least one of the heat exchangers. One or more generator-loaded hot-gas expanders are fluidly connected to the at least one combustion chamber and to at least one of the heat exchangers. The system further comprises at least one generator fluidly connected to at least one of the expanders, the generator producing electric power. In an embodiment of the energy release system, liquid air is released from the storage apparatus and flows in a first general direction. Working loop air, carbon dioxide ($CO_2$) or any other appropriate working fluid flows in a second general direction, and the second general direction is substantially opposite to the first general direction. The working loop air warms the released liquid air such that the released liquid air is substantially vaporized, and the released liquid air cools the working loop air such that the working loop air is substantially liquefied. The two streams never mix, but only exchange heat energy in one or more heat exchangers. The substantially liquefied working loop air is then pumped to pressure and vaporized by hot combustion gas. The vaporized high pressure working loop air is expanded in a generator-loaded hot-gas expander, wherein the generator produces electric power.

In exemplary embodiments, a working fluid is used instead of air. The working loop fluid flows in a second general direction, and the second general direction is substantially opposite to the first general direction. The working loop fluid warms the released liquid air such that the released liquid air is substantially vaporized, and the released liquid air cools the working loop fluid such that the working loop fluid is substantially liquefied. The two streams never mix, but only exchange heat energy in one or more heat exchangers. In exemplary embodiments, the working loop fluid is $CO_2$. The substantially liquefied working loop $CO_2$ is then pumped to pressure and vaporized by hot combustion gas. The vaporized high pressure working loop $CO_2$ is expanded in a generator-loaded hot-gas expander, wherein the generator produces electric power.

A portion of the released liquid air is directed to the at least one generator and used as bearing air for the generator. The substantially vaporized air is directed to a combustion chamber and combusted with a fuel stream. Combustion gas is directed from the combustion chamber to at least one expander and is expanded in the expander. The expanded combustion gas is split into a first portion and a second portion wherein the first portion is relatively larger than the second portion. The first portion of the combustion gas is directed to a first heat exchanger, where it vaporized the released and previously pumped-to-pressure liquid air, and the second portion is directed to a second heat exchanger such that the second portion heats and substantially vaporizes the liquid air that is produced in the loop air segment of the power outflow cycle. In this manner, the heat energy contained in the hot exhaust gas that exits a generator-loaded expander is used first to vaporize and warm the inlet air to the combustion chamber, and secondly to vaporize and warm the liquid air produced in the loop air portion of the cycle, allowing that hot, high pressure air stream to also be expanded in its own generator-loaded expander. Thus the cold energy contained in the outward flowing, pumped-to-pressure L-Air is used to liquefy a smaller stream of loop air, and the hot energy contained in the expanded combustion gas is used to vaporize those two pumped to pressure liquid air streams, both producing power.

Embodiments of the present invention include methods of releasing stored energy comprising releasing stored liquid air, pumping the released liquid air to pressure, and directing the released liquid air through at least one heat exchanger in a first general direction. Working loop air, $CO_2$ or other working fluid is directed through the at least one heat exchanger such that the working loop air flows in a second general direction wherein the second general direction is substantially opposite to the first general direction. The released liquid air is warmed by the working loop air such that the released liquid air is substantially vaporized, and the working loop air is cooled by the released liquid air such that the working loop air is substantially liquefied. The substantially liquefied working loop air is then pumped to pressure and vaporized by heat exchange with hot combustion gas. The pressurized working loop air is then expanded in a generator-loaded hot-gas expander such that the generator produces electric power.

In exemplary embodiments of release methods, a working loop fluid is used instead of air. Working loop fluid is directed through the at least one heat exchanger such that the working loop fluid flows in a second general direction wherein the second general direction is substantially opposite to the first general direction. The released liquid air is warmed by the working loop fluid such that the released liquid air is substantially vaporized, and the working loop fluid is cooled by the released liquid air such that the working loop fluid is substantially liquefied. In exemplary embodiments, the working loop fluid is $CO_2$. The substantially liquefied working loop $CO_2$ is then pumped to pressure and vaporized by heat exchange with hot combustion gas. The pressurized working loop $CO_2$ is then expanded in a generator-loaded hot-gas expander such that the generator produces electric power.

Methods of releasing stored energy further comprise directing a portion of the released liquid air to at least one generator and using the released liquid air as bearing air for the generator. The released liquid air cools the generator, and the generator warms the released liquid air. In a preferred method, a plurality of heat exchangers is provided and at least one of the heat exchangers is a cryogenic heat exchanger. An embodiment of the release method further includes directing the substantially vaporized and pressurized air to a combustion chamber and combusting the substantially vaporized air with a fuel stream. Combustion gas is directed from the combustion chamber to a first generator-loaded hot-gas expander, and the combustion gas is expanded in the first generator-loaded hot-gas expander.

The expanded combustion gas is then split into a first portion and a second portion with the first portion being relatively larger than the second portion. The first portion is directed to a main heat exchanger, where it vaporizes the main outflow stream of pumped-to-pressure liquid air and the second portion is directed to a second heat exchanger such that the second portion heats and substantially vaporizes the liquid air in the loop that is used to recover the cold from the main released air, where the loop air is heated and expanded in a second generator-loaded hot-gas expander. The formerly hot exhaust stream is directed from the main heat exchanger to a moisture separator, and the moisture from the hot exhaust stream is recovered in the moisture separator. That recovered liquid moisture is then pumped to pressure, warmed by recovered heat in a heat exchanger, and the recovered moisture is directed to the first generator-loaded hot-gas expander.

Thus, embodiments of the present invention provide energy storage methods and systems and energy release methods and systems to provide firm, consistent power from wind energy or other energy sources. These and other features and advantages of the present invention will be appreciated from review of the following detailed description of the invention, along with the accompanying figures in which like reference numerals refer to like parts throughout.

BRIEF DESCRIPTION OF THE DRAWINGS

The foregoing and other objects of the invention will be apparent upon consideration of the following detailed description, taken in conjunction with the accompanying drawings, in which.

DETAILED DESCRIPTION

In the following paragraphs, embodiments of the present invention will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations on the present invention. As used herein, the "present invention" refers to any one of the embodiments of the invention described herein, and any equivalents. Furthermore, reference to various aspects of the invention throughout this document does not mean that all claimed embodiments or methods must include the referenced aspects. Reference to temperature, pressure, density and other parameters should be considered as representative and illustrative of the capabilities of embodiments of the invention, and embodiments can operate with a wide variety of such parameters.

Figure 1:
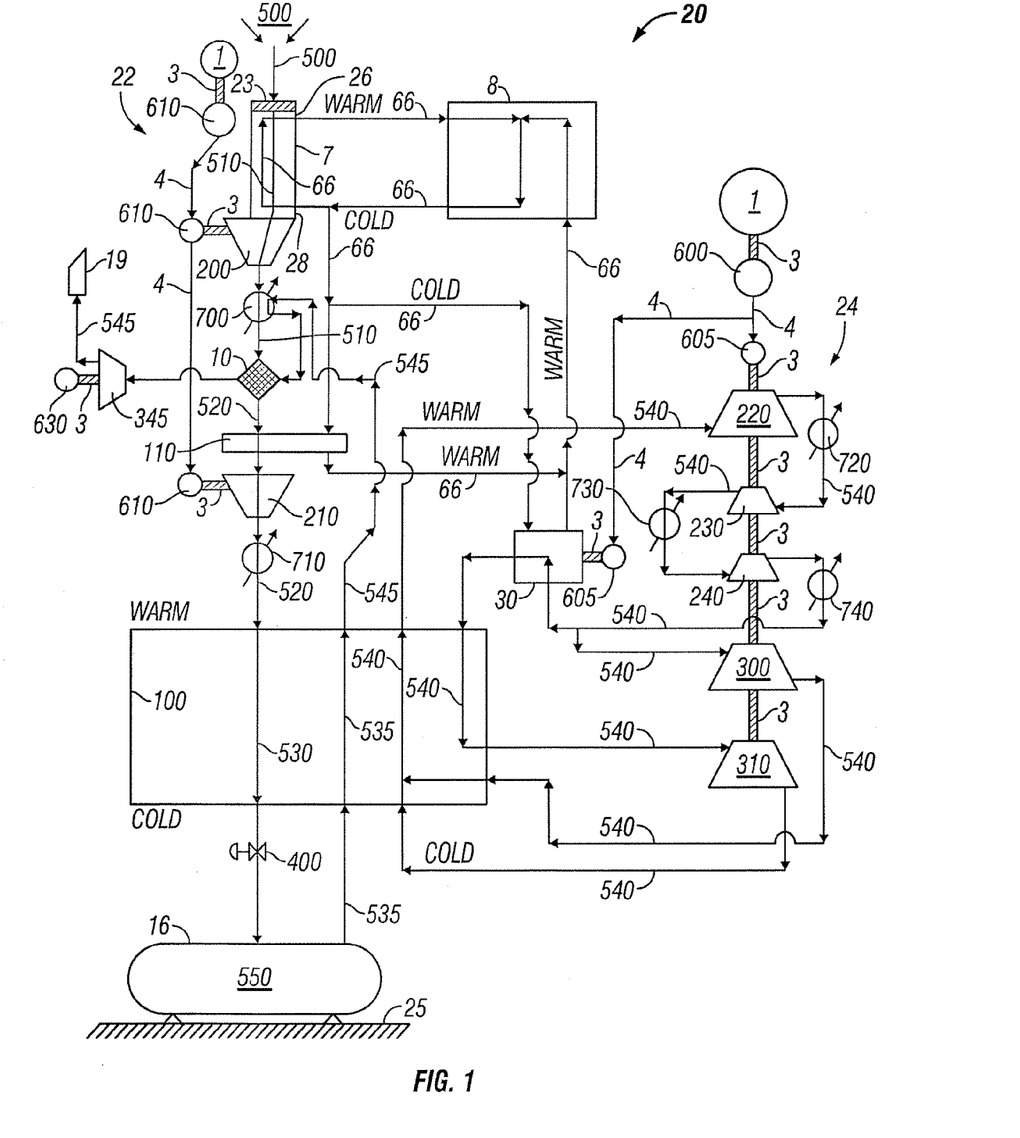
FIG. 1 is a process diagram of an embodiment of a power storage method and system in accordance with the present invention.

Referring to FIG. 1, an embodiment of a method and system for storing power is shown. The power storage system 20 generally comprises compression, cooling and clean up system 22 and independent refrigeration system 24, with both systems fluidly connected via main heat exchanger 100, which is preferably a cryogenic heat exchanger. Cold flue assembly 7 is vertically oriented with a top and a bottom and includes a plate fin heat exchanger (not shown). The vertical plate fin heat exchanger preferably has concentric "nested" circular plates (not shown). In some embodiments, the plates are like barrels within barrels, with a manifold at the top and bottom to hold them in place. The plates preferably are separated by fins. The manifolds allow the various fluid streams to enter and exit the top, middle and bottom of cold flue assembly 7. The cold flue assembly 7 may include a protective cover (not shown) and an air filter 23 at the top, and a set of condensation plates within the "flue". Those condensation plates allow the moisture content of the falling and cooling air to condense at approximately 32° F., removing approximately 90% of the moisture content of the air, allowing the cold water to be circulated to the top of the cold flue to act as a refrigerant to pre-cool the incoming (warm) air, after which it is sent to a drain or to the cooling tower that serves the absorption chiller 8, and which should be deemed to be "within" the rectangular symbol 8 shown on FIG. 1.

Instead of a normal flue that efficiently allows hot gases to rise to the top of the flue by "stack effect", the "cold flue" design allows the chilled air to sink through the top of the cold flue assembly, where it enters the flue at atmospheric pressure (approximately 14.7 psia) and warm temperatures (e.g., as warm as about 95° F.), laden with as much as about 55% relative humidity, and continues falling by gravity as it is chilled in the cold flue, sinking through the plate fin heat exchanger, increasing its density as it falls deeper into the flue, and reaching the bottom, sinking through the bottom and passing into an air compressor through the inlet to the compressor flange at sub-zero degrees (F) temperature, with very little pressure drop, without the need for electric powered blowers and fans to move it along. It should be noted that an ordinary plate fin heat exchanger in a standard horizontal configuration could be used instead of the cold flue assembly.

In a preferred embodiment, absorption chiller 8 is fluidly connected to cold flue assembly 7 at two locations so refrigerant may be directed to the cold flue assembly to cool the air that enters it, cycle through and then return to the absorption chiller to be re-cooled. Cooling is provided by refrigerant stream 66, preferably cold aqueous ammonia, which, after removing the heat from the falling air, is sent back to an absorption chiller for re-cooling. The colder the inflow air, the denser it is, and the less energy input will be required to compress it. It is that increasing density that, by gravity, allows the air to fall down the cold flue 7 toward the first compression, with very little pressure drop. The absorption chiller is "powered" by several heat recovery systems (heat exchangers) where the heat of compression is the heat source used by the absorption chiller. For the sake of clarity, those heat exchange loops are not shown. Instead, those sources of heat energy for the absorption chiller are shown as the various inter- and after-coolers at each compressor. The one exception is intercooler 700 which delivers its heat of compression mostly to sweep air stream 545 which is thus warmed and used to "sweep" or regenerate molecular sieve 10, purging its $CO_2$ and moisture content. Prior to venting that sweep air stream through vent 19, the sweep air is expanded to just nearly atmospheric pressure in hot-gas expander 345 which is loaded by generator 630, thus producing power that can be used by various pumps, sensors, meters and motors. The expansion of the warm sweep air 545 is possible because the flash air that is the source of the sweep air left the cryogenic storage vessel at a pressure of approximately 70 psia. The flash-to-sweep air route not only serves to recover the cold energy of the flash air, in heat exchanger 100, but also serves to recover the heat of compression found in inter-cooler 700, thus allowing that hot sweep air to produce "free" power in generator loaded expander assembly 34, 3, 630.

In this context, the term "inlet air compressors" used in the summary of the present invention refers to those compressors shown on FIG. 1 that bring the ambient inlet air up to pressure prior to liquefaction and arrival in the liquid air storage tank. Those inlet air compressors are shown as 200 and 210 on FIG. 1, but may be configured in various other ways. A first compressor 200 is directly below and fluidly connected to cold flue assembly 7. Compressor 200 is in fluid connection with first inter-cooler 700, which may provide waste heat to warm flash stream 535 and warm vapor portion 545, as described above. The cooling and clean up system 22 of energy storage system 20 further comprises molecular sieve assembly 10, which could be a multi-vessel configuration, a pre-cooling heat exchanger 110 and a second compressor 210 and after-cooler 710. After-cooler 710 is fluidly connected to the main heat exchanger 100, which is in fluid connection with one or more of compressors 200 and 210 and storage apparatus 16, a cryogenic, insulated tank suitable for storing liquid air.

The storage method will now be described. Inlet air 500 is directed through vertical cold flue assembly 7. The inlet air 500 enters the top 26 of the cold flue assembly, preferably from at least one power source 1 (which could be any firm, i.e., base load, power source or any intermittent power source such as a wind turbine). Cold flue assembly 7 includes a plate fin heat exchanger (not shown). The inlet air 500 sinks downward through the plate fin heat exchanger and through the bottom 28 of the cold flue assembly 7. The "cold flue" design allows the chilled inlet air 500 to fall from the top, where it enters the flue and continues falling by gravity as it is chilled in the cold flue, increasing its density as it falls deeper into the flue, and reaching the inlet to the compressor flange at approximately 32° F., with very little pressure drop, without the need for electric powered blowers and fans to move it along. Refrigerant stream 66 cools the inlet air 500 as it passes through cold flue assembly 7. Thus, the inlet air 500 is cooled and moisture is removed from the air within the cold flue assembly 7.

The inlet air 500 (likely warm in the summer and cold in the winter) sinks to the bottom of cold flue assembly 7 and, as partially cooled air 510, enters the first compressor 200, or first stage of a multi-stage compressor, where it is compressed to a first pressure of approximately 35 psia. The power to drive the compression steps and cooling steps of the method is provided by power sources or energy conversion sources, which include, but are not limited to, wind power when such power is available, power from an electric grid or an independent power plant, nuclear, coal, geothermal, solar, hydro-power, landfill gas, anaerobic digester gas, coal bed methane, associated gas, recovered heat from large industrial plants, recovered cold from liquid natural gas import terminals, wave and tidal energy.

The heat of compression preferably is recovered and directed to absorption chiller 8 to drive the absorption chiller. In a preferred embodiment the heat of compression is used to warm the sweep air 545 that regenerates a molecular sieve, as described above and below. Another use for the recovered heat of compression is to provide (heat) energy to an absorption chiller whose purpose is described below. The partially cooled inlet air 510, having given up approximately 90% of its moisture content continues to molecular sieve assembly 10 where its $CO_2$ content and the remaining moisture are removed from the air by adsorption in zeolyte or other such materials known in the art. In a preferred embodiment, that moisture is regenerated (or purged of its saturated $CO_2$ and moisture) by warm, medium-pressure air that begins as "flash" air in the L-Air storage tank and serves as the "sweep air" 545 that regenerates the molecular sieve. Such molecular sieve arrangements, utilizing two or more vessels, and relying on a hot, clean, pressurized gas for regeneration, are commonly used in various gas processing systems and are well understood by process designers and manufacturers. The molecular sieve assembly 10 may be a multi-vessel configuration, allowing for regeneration of one or more vessels while one or more of the remaining vessels remove the $CO_2$ and moisture from the air stream. The remaining moisture and carbon dioxide ($CO_2$) are removed from the air by adsorption, preferably using a molecular sieve assembly.

Exiting the molecular sieve assembly 10, the dry inlet air 520 is further cooled by the absorption chiller and compressed to a second pressure of approximately 75 psia and after the removal and recovery of the heat of compression, as described above, moves on toward the main heat exchanger 100 at approximately 50° F. It should be noted that a single stage of compression of the air could work, but would likely yield reduced efficiency. Alternatively, three or more stages of compression could work and may yield better efficiencies but with added complexity and increased capital costs. As discussed below, the selected exit pressure from the second stage of compression (or single stage if performed with one compression stage) may vary and will depend on the selected storage temperature and pressure for the liquid air that is stored in storage tank 16.

The cool (but not cold), dry, approximately 74 psia inlet air 520, with a very low $CO_2$ content of approximately 1.0 parts per million, then enters the main heat exchanger 100 for cooling. The dry inlet air 520 is chilled to approximately −283° F., and having lost some pressure, exits the main heat exchanger 100 as substantially liquefied (and partially as a cold vapor) air 530 at approximately 73 psia, travels through cryogenic flow and pressure control valve 400 and enters a storage apparatus 16, preferably an insulated, cryogenic, L-Air storage tank(s) at approximately 70 psia and about −283° F. 75 psia was selected in this model so as to allow the liquid air that is produced by the in-flow cycle to be stored at that pressure in an L-Air storage tank, at about −283° F. Other storage pressures will yield other temperatures for the L-Air, and may be selected, in lieu of the about 70 psia, −283° F. conditions discussed here. In that event, the compression to approximately 75 psia in the second stage would be adjusted appropriately. Those decisions are "optimizations" that may be selected as part of the engineering process for each deployment. Another optimization might use three-stages of inlet air compression.

Approximately 15% of the inflowing substantially liquefied air 530 will "flash" as the liquid plus vapor enters the storage tank at approximately −283° F. and about 70 psia. While this vapor portion 535, or flash air, is quite cold, it is a relatively small stream. Therefore, this cooling of the partially cooled inlet air 510, to substantially liquefied air 530, is performed by a refrigerant air stream. Independent refrigeration system 24 provides the bulk of the refrigeration required to liquefy the dry inlet air 520. In a preferred embodiment, independent refrigeration system 24 may include a cryogenic air compression/expansion refrigeration system augmented by a mechanical chiller 30, which is augmented by the ammonia absorption chiller 8.

The independent refrigeration system, or "refrigerant loop air assembly", comprises a continuous loop of air (refrigerant loop air 540), which is independent of the inflow air that is sent to the liquid air storage tank. That refrigerant loop comprises several compressors (shown as 220, 230 and 240 on FIG. 1, which may be referred to as "refrigerant loop air compressors") and several cryogenic expanders (shown as 300 and 310 on FIG. 1, which may be referred to as "refrigerant loop air cryogenic expanders"), where the expansion of higher-pressure air causes that air (the working fluid) to be chilled. The chilling of that air stream is augmented moderately by a standard mechanical chiller, which in turn is aided by the low-grade cooling from an absorption chiller. The absorption chiller gets its energy from recovered heat of compression, and assists the mechanical chiller by helping to condense the refrigerant (working fluid) within the mechanical chiller. The configuration shown on FIG. 1 indicates that compressor 220 is fluidly connected to the main heat exchanger, and that expander 310 is so connected. However, other configurations are covered by embodiments of the invention and may be selected for reasons related to capital cost relative to operating efficiencies or other reasons.

Mechanical chillers typically contain an evaporator, compressor and condenser and are driven by an electric motor or directly by a fueled engine. The refrigerant, such as a hydrocarbon or a variant of "Freon" moves through the chiller in a cycle of compression and evaporation, absorbing heat and rejecting heat, thus achieving refrigeration, but requiring a power source to drive the compressor. Mechanical chillers are distinct from absorption chillers and from turbo-expansion chillers. All three types are used at optimal points in the subject cycle. The mechanical chiller that is integrated with the refrigerant loop is powered by the same sources (such as wind power), as are the inlet compressor, and the compressors for the refrigerant loop. In addition, a significant portion of the refrigeration load of the mechanical chiller is reduced by sending it a stream of cold refrigerant from the absorption chiller, mentioned above, which is driven by recovered heat of compression. The refrigerant air stream used in the refrigeration loop is preferably air, as described in more detail herein, but other refrigerants known in the art may also be used. The refrigerant loop air 540 travels around subsystem 24 without any blending with the air in subsystem 22, but cooling the air in subsystem 22 by removing heat. An illustration of one arrangement of refrigerant loop air compressors and refrigerant loop air expanders can be found on FIG. 1, subsystem 24, as items 220, 230, and 240, representing the compressors, and items 300 and 310, representing the cryogenic expanders. Other configurations may be selected and are covered by embodiments of the present invention.

The mechanical chiller 30 is fluidly connected to the compressor-expander array, and also fluidly connected to the absorption chiller, which, by sending a cool stream of refrigerant to the mechanical chiller, helps condense the refrigerant within the mechanical chiller. Thus, the totality of refrigeration applied to the liquefaction of the inflowing compressed air stream is provided by three types of refrigerators—compression and expansion, mechanical chilling, and ammonia absorption chilling—in an optimal array where each refrigerator is working within its most efficient range and each reinforces and augments the cooling work performed by the other. The refrigerant air stream may be directed to and from the main heat exchanger to the independent refrigeration assembly, which preferably is a closed loop system. Thus the refrigerant air stream constitutes a refrigerant air stream in a loop that undergoes refrigeration in several steps by several devices, cooling the refrigerant air as it travels through its loop to temperatures cold enough to liquefy the inflowing compressed, dried, $CO_2$-free air, with which the refrigerant air is heat exchanged in the main heat exchanger.

The refrigeration system 24 uses dry air as the working fluid, moving through a series of compression, expansion and heat exchange steps in a continuous loop (the "refrigerant loop process"), independently of the air stream that is compressed, liquefied and sent to storage. The two air streams never mix, but undergo heat exchange only. Other fluid refrigerants may be used in lieu of air if desired. The mechanical chiller 30 may be powered by the same energy input as the compressor/expansion array, and augmented by the cold refrigerant stream 66 from absorption chiller 8. The inclusion of mechanical chiller 30 helps increase the efficiency of the independent refrigeration system but with a modest increase in complexity and capital costs. The independent refrigeration system 24 comprises a plurality of compressors 220, 230, 240 to compress the refrigerant air stream 540 and a plurality of expanders, shown here as first and second refrigerant loop air cryogenic expanders 300, 310 to cool the refrigerant air stream. The plurality of compressors preferably includes a main multi-stage compressor 220 (preferably four-stage) and first and second booster compressors 230, 240 (or booster stages). The plurality of expanders may include two expander stages. The compressors and expanders preferably are all on the same shaft 3, powered by a wind-driven generator/motor 600 (or other power source). Other configurations that separate the compressor stages and/or the expander stages onto multiple shafts with various power transmission systems are also feasible. The configuration shown is just one possible arrangement and was selected for illustrative purposes. Other configurations are contemplated by embodiments of the invention, and those of skill in the art would be able to employ various configurations.

The refrigerant loop air stream 540 exits the main cryogenic heat exchanger 100 and flows back to the independent refrigeration assembly 24, where it is compressed by the plurality of compressors 220, 230, 240 and the heat of compression is recovered by the energy flow assembly and sent to power absorption chiller 8. The inflow refrigerant loop air stream 540 sent to the main four-stage compressor 220 is approximately 40° F. and about 85 psia, having given up its "refrigeration content", in the main heat exchanger 100, to the substantially liquefied air 530 that is being liquefied for storage. FIG. 1 shows third inter-cooler 720 that recovers the heat of compression from multi-stage compressor 220. In reality that third inter-cooler 720 is a group of inter-coolers and an after-cooler, arranged after each stage of compression, but shown in FIG. 1 as a single unit for the sake of clarity. The stream is compressed to approximately 700 psia, inter- and after-cooled (as described above), and sent to a booster compressor 230, where it is compressed to a first pressure of approximately 840 psia, and the refrigerant air stream 540 exits the booster compressor at this pressure. The heat of compression is recovered by heat transfer (via heat exchanger) from the inter- or after-cooler and transferred to an appropriate place in the cycle, such as to the absorption chiller and to a lesser extent to the flash air stream that regenerates the mole sieve. Then refrigerant air stream 540 is after-cooled in a fourth inter-cooler 730 and sent to a second booster 240, where it is compressed to a second pressure and exits at approximately 1,150 psia, after-cooled and directed to the main heat exchanger 100 at approximately 50° F. Note that the refrigerant air stream 540 is shown on FIG. 1 with several "splits" in its flow stream, but which all re-connect so that stream 540 can be seen as a single continuous loop. It should also be noted that the refrigerant stream could be compressed in one stage, but with a substantially reduced efficiency. As discussed elsewhere herein, the various inter- and after-coolers shown in FIG. 1 recover the heat of compression that is produced by the several compressors. Second after-cooler 740, for example, recovers the heat of compression produced by second booster compressor 240.

The stream is split in two, with one stream moving to the mechanical chiller 30 and the other stream moving to refrigerant loop air cryogenic expander 300. The portion that travels to the mechanical chiller is cooled to −40° F. and further cooled in heat exchanger 100 to −80° F., exiting the heat exchanger with a slight pressure drop, and moving on to expander 310, exiting that expander at approximately −290° F. and at approximately 88 psia. The other portion of the stream 540 that did not travel to the mechanical chiller is cooled by the refrigerant loop air cryogenic expander 300. That portion of stream 540 exits refrigerant loop air cryogenic expander 300 at approximately −204° F. and 87 psia and joins the portion of stream 540 that exits expander 310. The two streams join in heat exchanger 540, providing the refrigeration needed to substantially liquefy stream 530.

As mentioned above, approximately 15% of the substantially liquefied air 530 will "flash" as the liquid plus vapor enters storage tank 16. That vapor portion 535 of the substantially liquefied air, or flash stream, is directed from the L-Air storage tank 16 and travels (at approximately 70 psia) to the main heat exchanger 100. There, the vapor portion 535 acts as one source of refrigeration, the recovered cold being used to further cool the dry inflowing or inlet air 520 described above, which is moving through heat exchanger 100 as stream 530 in substantially the opposite direction from the path of the flash air 540. The inlet air 530 also warms the vapor portion 535 of the substantially liquefied air 550. After cold recovery and further heating from recovered heat, the warmed vapor portion 545, which can now be called sweep air, is further heated by inter-cooler 700 and directed to the molecular sieve assembly 10 where it is used as a "sweep gas" to remove the carbon dioxide and moisture that has been deposited on the molecular sieve assembly 10. The warmed sweep air 545 that exits the molecular sieve 10 and may travel through a small, generator-loaded hot-gas expander, which is shown on FIG. 1 as items 345 (the generator-loaded hot-gas expander), shaft 3 (a rotating shaft that connects the expander to a generator), and 630, the generator. That assembly would provide some of the power needed by instruments and the like, recovering a worthwhile portion of the energy remaining in the hot sweep gas. The now expanded and cooled sweep gas leaves the system by way of air vent 19. That sweep gas merely returns the $CO_2$ and moisture content of the original inlet air 500 to the surrounding atmosphere. No additional $CO_2$ or moisture is sent out through vent 19.

As discussed throughout, the various compressors generally are not driven directly by a wind turbine or another intermittent power source, but by motors that receive electric power from wind turbines, from a small portion of the power output of the system, from a base-load power plant where the system may be deployed or from the electric grid, or from any other power source(s). As is understood by those familiar with power production systems, generators and motors are essentially the same, but with one rotating in the opposite direction from the other. For example, FIG. 1 shows a wind turbine driving the independent refrigeration system generator 600, which in turn provides power by cable 4 to a motor 605, which drives the compressors on shaft 3, shown as independent refrigeration system 24. The independent refrigeration system motor 605 may get its power from any other power source, not just the wind-turbine-driven generator 600 shown above it.

It should be noted that FIG. 1 illustrates an embodiment of the inlet air compression, clean up, refrigeration and energy storage systems of the present invention. Much of the piping, valves, sensors, insulation, and other "hardware" and software that would be part of an engineered design of the same embodiment are not shown because all such aspects are well understood by gas processing and power production engineers. Similarly, the internal configurations for the absorption chiller, the inter- and after-coolers, the mole sieve, the expanders, compressors, generators and motors are not shown. Power cable connections 4 are shown in several places in FIG. 1, connecting power-producing generators with motors that drive compressors. Other cables, not shown, would connect to instruments, electrically operated valves and the like.

Various other arrangements of the inflow/energy release and replacement system 20 using the same or similar components can be arranged to optimize the cost and performance of the system and to create a compact "footprint" at the deployment site. The scale of the system can also vary, possibly to under 2 MW of firm power output and up to hundreds of MW of output, where land is available for the required amount of L-Air storage.

Figure 2:
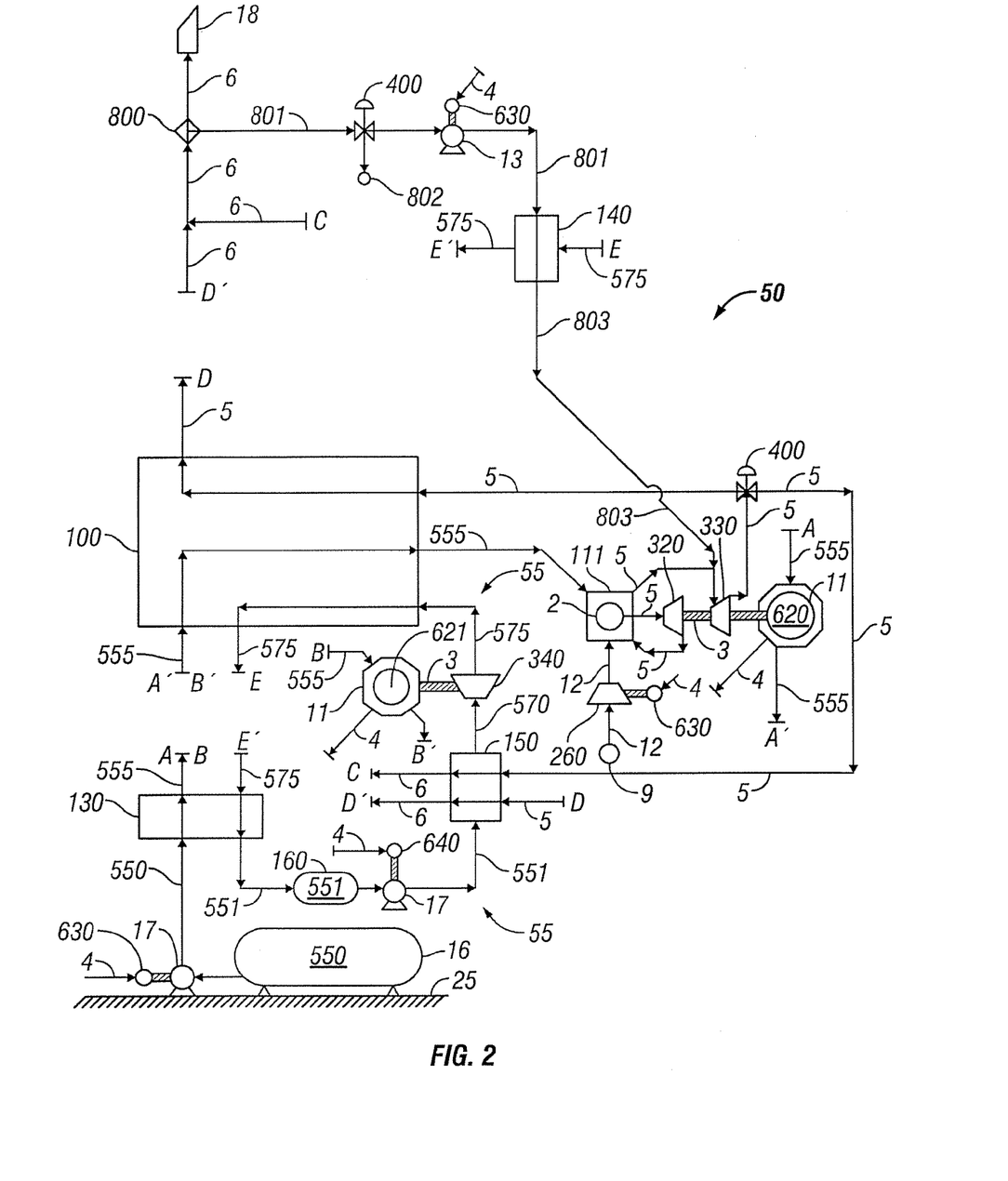
FIG. 2 is a process diagram of an energy release method and system in accordance with the present invention.

Turning to FIG. 2, an energy release system and method, or energy send-out mode, is shown. FIG. 2 shows energy release system 50 and its subsystems, but, for the sake of clarity, in a manner that does not show those elements of the overall system that are dormant during outflow. For example the cryogenic refrigeration loop described above is not shown in FIG. 2, even though it would still be physically connected to the main heat exchanger 100. The absorption chiller is not shown because it is not needed during send-out. Similarly, a cryogenic pump shown in FIG. 2, as part of the outflow process, was not shown in FIG. 1, even though it is generally connected to the L-Air storage tank(s) 16 ready for service.

An embodiment of the invention includes a method of releasing stored energy, by the release of "outflow" liquid air as described here. Stored liquid air 550 is released from storage apparatus 16, pumped to pressure by cryogenic pump 17, such that the released high-pressure liquid air 550 flows in a first general "outward from storage" direction substantially opposite to a second general direction in which the independent loop of air flows, which loop of air acts as a working fluid, being condensed and liquefied by the main outflow air stream and being heated, vaporized by recovered waste heat, as described below, and where the vaporized air is expanded in a generator-loaded hot-gas expander, producing a portion of the power that is sent out during the energy release mode. In this context the terms "independent loop of air" or "working loop air" is meant to cover the independently circulating air or other working fluid in subsystem 55, shown on FIG. 2, and noted by reference numbers 551, 570, and 575. It should be noted that other suitable working fluids could be used in place of working loop air. One possibility is carbon dioxide ($CO_2$), but any fluid that can be boiled at a high pressure and condensed at a cryogenic temperature and low pressure could be used. The term "working" is used here in the same sense as one might use "working fluid", for example the water-to-steam cycles that are common in combined cycle power plants. In this context the working loop air is liquefied, pumped to pressure, heated by heat exchange, expanded in a generator-loaded expander—hence work is performed—partially cooled during expansion, then further cooled by heat exchange, then liquefied (condensed), allowing the cycle to begin again.

The released liquid air that leaves the cryogenic liquid air storage vessel is first pumped to pressure, preferably by a cryogenic pump. The released liquid air 550 flows past the counter-flowing working loop air or other fluid such as working loop $CO_2$ 575 such that heat exchange occurs between the two streams. The counter-flowing working loop air or working loop $CO_2$ 575 (which is the smaller stream) warms the released liquid air 550 by heat exchange such that the released liquid air is substantially vaporized, and the released liquid air cools the loop air or $CO_2$ 575 by heat exchange such that the "loop air" is substantially liquefied. As the loop air or $CO_2$ 575 is liquefied by the larger stream of liquid air, it arrives at a temporary storage or buffer tank 160, after which it is pumped to pressure, warmed in heat exchanger 150 by hot exhaust gas streams 5 which delivers exhaust heat from a generator-loaded hot-gas expander 330 (more fully described below) and expanded in a generator-loaded hot-gas expander 340 shown as 621 (generator) and 340 (expander which are fluidly connected on shaft 3, and where the generator is an air bearing type where air stream 555 supports the rotating generator within housing 11 and takes away the heat of friction, thus helping to warm air stream 555 at points B and B', as shown in FIG. 2, prior to the air arriving to heat exchanger 102. Its remaining heat is used to pre-warm the larger, high-pressure vaporized formerly-liquid air stream 555 that is on its way to combustion chamber 2, where that outbound air combusts with a fuel 12 (such as natural gas delivered by pipeline 9), after which the hot, high-pressure product of combustion 5 is sent through one or more hot-gas expanders that are generator-loaded, converting the energy content of the previously liquid air into electricity, and over several hours, emptying the liquid air storage tank 16 so that it is again ready to store energy, as liquid air. The generator 620 is also of an air bearing design, such that air stream 555 is diverted to generator 620, as indicated by points A and A', allowing the cold air to be warmed by the heat of friction produced by the rotating generator 620, and thus pre-warming stream 555 on its way to heat exchanger 102.

Thus, the preferred embodiment produces electric power in two "modes"; as a consequence of the expansion of the heated and vaporized high-pressure loop air or $CO_2$ (which is never sent to a combustion chamber), and as a consequence of the larger stream of outgoing air that helps combust a fuel, producing a large stream of hot gas which is expanded to produce the major portion of the electricity output.

Also, FIG. 2 shows some of the same elements shown in FIG. 1 but in slightly different positions. For example, in FIG. 1, the main heat exchanger is shown in close proximity to L-Air storage tank 16, whereas in FIG. 2 cryogenic heat exchanger 130 is shown between tank 16 and heat exchanger 102.

FIG. 2 shows the cold L-Air 550 and cold pressurized air 555 moving "up" from storage, with warm counter-flowing expanded air (or counter-flowing loop air or $CO_2$) that travels in a closed loop 55 acting as a cold recovery medium in cryogenic heat exchanger 130. This is an important feature of this preferred embodiment because the refrigeration content of the stored L-Air is recovered to "condense" (liquefy) a stream of air or $CO_2$ that is subsequently heated and then expanded to produce additional power, as outlined below.

The stored L-Air 550 is released from storage and leaves the storage tank(s) 16 at −283° F. and approximately 70 psia by way of a cryogenic pump 17 that pressurizes the liquid by pumping it to a pressure of approximately 590 psia. It should be noted that other pressures would also work and would depend on the selected hot-gas expanders and the design pressures under which the expanders operate. That pumping requires very little energy (approximately 0.1 MW) because a liquid is (virtually) incompressible and will achieve that pressure with very little energy input. Cryogenic pump 17 is driven by pump motor 630 which receives a small portion of the total power output of the system by cable 4. It should be noted that the pumped-to-pressure effect of the cryogenic pump 17 yields "compressed" air, once the air is vaporized, and that the terms "pumped to pressure" and "compressed" cover the same state of "high-pressure" where the first term applies to the liquid state of the air, and the second term applies to the vaporized state.

The pumping of the L-Air 550 to approximately 590 psia raises its temperature slightly, to about −280° F. The high-pressure, cryogenic L-Air 550 then travels through cryogenic heat exchanger 130, liquefying the counter-flowing "loop" air or $CO_2$ that is the working fluid that is expanded in generator-loaded hot-gas expander 340, which is loaded by generator 621, yielding approximately 23% of the system's total power output, or approximately 28% of the power output of the main generator 620. Thus, liquid air stream 550 is vaporized by "loop" air or $CO_2$ stream 575, which in turn is liquefied by the cold content of 550, but not at the same flow rate. In exemplary embodiments, that cold recovery exchange occurs at a rate where the "loop" airflow is approximately 84% of the flow rate of the main outbound stream 555. The cold pressurized air 555 (formerly L-Air) is further warmed in heat exchanger 102 by the warm "loop" air or $CO_2$ 575 that leaves generator-loaded hot-gas expander 340 and by the larger stream 5 that leaves the main hot-gas expander assembly that drives generator 620.

Continuing with FIG. 2, the stream of outflow air 555 leaves heat exchanger 102 at approximately 900° F. and approximately 588 psia, arriving at combustion chamber 2 where it combusts the fuel stream 12 that has been boosted to the same pressure by compressor 260, which is driven by motor 630, powered by electricity delivered by "wire" 4, and the fuel stream having been delivered to compressor 260 by fuel line 9.

The combustion chamber 2 is housed in a heat exchanger housing 111 that allows for the re-warming of return exhaust streams as shown in FIG. 2. For example, after the hot, high-pressure combustion gas 5 leaves combustion chamber 2 and is expanded in first generator-loaded hot gas-expander 320, it is returned for warming in heat exchanger 111, and then sent on for further expansion in second generator-loaded hot gas-expander 330. This is known in the industry as a "two stage expansion with reheat" and serves to increase the efficiency of the hot gas expansion (and power generation) cycle. Other configurations for expanding the hot gas that is the product of combustion may be used, some yielding lower capital costs and lower efficiencies and others costing more and yielding slightly higher efficiencies. The configuration shown in FIG. 2 is meant as an illustration of one arrangement but is not meant to exclude other arrangements.

Stream 5, leaving generator-loaded hot-gas expander 330, is shown "split" by valve 400. A larger portion is sent on to heat exchanger 102, as described above, and then on toward flue 18. A smaller portion is sent to heat exchanger 150 where it helps to vaporize and heat the liquid air 551 that leaves a buffer tank 160 and which is first pumped to pressure by a cryogenic pump 17, which is driven by motor 640. It should be noted that the use of reference numbers, 600, 605, 610, 630, 640, etc. for the various motors in the system does not suggest anything about the size and capacity of each referenced motor. The specific power output of each motor will be determined by the engineering decisions that are applied to the system when each deployment is designed. Continuing with the cold recovery and power generation loop 55, the hot, high-pressure air 570 leaves heat exchanger 150 at approximately 900° F. and 1,200 psia and is expanded in third generator-loaded hot-gas expander 340, exiting at approximately 425° F. and 200 psia as stream 575. That heat content helps warm the main outflow air stream in heat exchanger 102, as described above.

FIG. 2 shows several "breaks" in the gas streams as a simple way to indicate cold and heat recovery steps. For example the main outflow stream 555 is shown "broken" at A to A', indicating that a portion of stream 555 is first sent to main generator 620 as bearing air that helps float the rotating generator 620 in its housing 11. In this manner, stream 555 picks up the heat of friction from the rotating generator, cooling the generator, and pre-warming stream 555 before it enters heat exchanger 102. Thus, points A to A' located between heat exchangers 130 and 102 are the same A to A' points shown near generator 620. Similarly, a portion of stream 555, represented by points B to B' between heat exchangers 130 and 150 serve the same "air bearing" heat recovery function in secondary generator 621 and correspond to stream 555 shown between points B and B' near generator 621. Another "stream break" is indicated by the set of points on FIG. 2 marked C, showing how heat is recovered in heat exchanger 150 from the portion of the hot exhaust stream that travels through heat exchanger 150, warming stream 551. The cooled exhaust gas stream 6 that exits heat exchanger 150 is shown ending at point C which corresponds to point C above D' near flue 18. Thus, point C near heat exchanger 150 is the same point as point C shown near flue 18. Similarly the set of points D and D' represent the heat recovery of the main exhaust stream 5 giving up its remaining heat (after it leaves heat exchanger 102) and also warming stream 551 in heat exchanger 150. Similarly, the warm loop air or $CO_2$ 575 that leaves heat exchanger 102 at approximately 120° F. is "broken" at points E to E', indicating that the remaining heat content of stream 575 is used to warm the moisture 801, which is recovered in moisture separator 800 in warm heat exchanger 140, so that the pumped-to-pressure moisture 803 can be sent to generator-loaded hot-gas expander 330 as a high-pressure water vapor stream, thus increasing the mass flow through the expander, and improving its power output.

Power cable connections 4 are shown in several places in FIG. 2. Each such cable may be differently sized from any other cable, reflecting the required amount of power it needs to carry. Other cables, not shown, would connect to instruments, electrically operated valves and the like.

Shop fabricated L-Air storage tanks are readily available. Horizontal tanks can be deployed in "sculpted earth" containment areas where a modest depression in the local grade level 25 is created to contain the tanks behind a modest berm that is assembled from the excavated material. Such a configuration will yield a very-low profile for the storage tanks. Three 75,000-gallon shop fabricated L-Air storage tanks is preferred for the model outlined herein, but fewer may be used depending on the circumstances, and field-erected tanks of the same or larger capacity may also be used. A fourth or fifth tank would substantially increase the storage and outflow options, allowing for extra input capacity during weekends and on windy nights and allowing for "excess air send-out" during high-demand periods, as discussed above. That extra degree of flexibility is achieved by the relatively low-cost and low-tech effort of adding one or two L-Air storage tanks to the basic three that are required to keep the inflow and out-flow modes in balance.

In addition to low-pressure (under 100 psia) cryogenic storage tanks that would contain liquid air, the present invention also contemplates the storage of cold-compressed-air (CC-Air) in cryogenic pressure vessels. CC-Air can be defined as a vapor (non liquid) form of air that is very cold (for example, colder than −200° F.) and at a significant pressure (for example, more than 500 psia), such that the density of the CC-Air is more than 32 pounds per cubic feet (for example, achieving 70% of the density of L-Air). Such CC-Air can be pumped to a higher pressure with very little additional energy input, much like L-Air, and can be stored in a relatively efficient storage vessel because, at approximately 70% the density of L-Air, it is significantly denser than compressed air, but having the benefit of requiring some 30% less energy input to produce. Thus, the present invention also includes the production, storage and release of CC-Air. That option will likely be most viable in smaller embodiments of the invention, say, under 10 MW of stored energy output, where the size of the storage vessel(s) is not as critical as the energy input to produce the stored air. Indeed, the present invention includes a wide range of dense cryogenic air storage options, from the near-liquid CC-Air option at 500 psia and higher, to the L-Air option at under 100 psia and any such dense-phase cryogenic air conditions, at any appropriate temperature and pressure, where the combination of temperatures and pressures yield air that has a density in excess of approximately 25 pounds per cubic feet.

FIG. 2 shows fuel pipeline 9 delivering a fuel stream 12, which would be natural gas in some cases, to fuel booster compressor 260 that brings the pressure of the NG to the design pressure of generator-loaded hot-gas expanders 320 and 330. Other fuel delivery methods would work equally well. For example, as an alternative to pipeline-delivered NG, embodiments of the invention can use landfill gas, anaerobic digester gas, or coal bed methane as a fuel source, or NG from a "stranded well" or "associated gas" that is found with oil wells. In some instances, the fuel stream would need no booster compression because, for example at some stranded gas wells, the pressure of the gas stream would be as high or higher than the design pressure for the generator-loaded hot-gas expanders 320 and 330.

FIG. 2 shows a fuel booster compressor 260 for the natural gas (NG) fuel stream 12, raising the pressure of that stream from, e.g., 60 psia to 588 psia, the same as the assumed pressure of the compressed air that arrives at combustion chamber 2. That booster compressor uses very little energy (less than 0.3 MW) relative to the total power output of the energy release stage of the system. It will use even less energy if the fuel gas arrives at the site at a higher pressure, such as from a high-pressure regional natural gas transmission line or from certain stranded gas fields. Other fuels can be substituted for the NG at the appropriate rate (relative to the compressed air flow), yielding similar power output results. If wind power were also available during the power output cycle outlined above, its energy would be added directly to the output of the power plant, rather than converted to L-Air. The exhaust gas leaving the combustion chamber, or combustion gas, is about 2,000° F., but this high temperature is achieved with less fuel than in other cycles because the inlet air was pre-warmed to about 900° F. The approximately 2,000° F., about −8 psia combustion gas is expanded in a two-stage generator-loaded hot-gas expander 320, 330, first to approximately 98 psia and then down to about 16 psia. The somewhat cooled outflow from the first stage of expansion 320 is re-heated to about 2,000° F. at the combustion chamber, and sent to the second stage 330 (at approximately 96 psia), leaving the second stage at approximately 1,141° F. and about 16 psia. As discussed above, the exhaust stream 5 that leaves generator-loaded hot-gas expander 330 is split in two by a valve. Each portion of the split stream is used to heat other streams, as discussed above, in heat exchangers 102 and 150. The two streams rejoin as stream 6 and arrive at moisture separator 800, where the moisture content of the cooled exhaust gas 6 is separated and sent on partially toward drain 802 and in part through a pump 13 and warm heat exchanger 140 and then to generator-loaded hot-gas expander 330. The moisture content of cooled exhaust stream 6 can be separated out because the stream has cooled enough to allow the moisture to condense. However, not all of the recovered moisture can be used by generator-loaded hot-gas expander 330, so some of the recovered moisture is sent to drain 802. Pump 13 pressurizes that moisture, with very little energy input (because liquids are virtually incompressible and thus reach a desired pressure with very little energy input). When that high-pressure 801 stream is heated in 140 it leaves as mostly vapor 803, thus providing a low-cost way to increase the mass of the gas stream that is being expanded in 330. The purpose of stream 803 is to increase the hot-mass-flow through generator-loaded hot-gas expander 330, thus improving the power output of generator 620.

For applications of the VPS Cycle for wind power storage, each deployment of an embodiment of the invention will likely be based on a site's "wind history", and projected "capacity factor", accounting for day/night and seasonal patterns, which would be projected forward, and compared to peak electric demand that would also account for day/night and seasonal patterns. The total amount of L-Air storage chosen for each system deployment will balance the need for certainty and wind-reliability against the cost of storage (tanks, valves, and piping), within the limitations of the land area available for the storage system.

Thus, it is seen that energy storage and release systems and methods are provided. It should be understood that any of the foregoing configurations and specialized components may be interchangeably used with any of the systems of the preceding embodiments. Although preferred illustrative embodiments of the present invention are described hereinabove, it will be evident to one skilled in the art that various changes and modifications may be made therein without departing from the invention. It is intended in the appended claims to cover all such changes and modifications that fall within the true spirit and scope of the invention.

The invention claimed is:

1. An energy release system comprising:
 a storage apparatus;
 one or more heat exchangers, at least one of the heat exchangers being fluidly connected to the storage apparatus;
 at least one combustion chamber fluidly connected to at least one of the heat exchangers;
 one or more generator-loaded hot-gas expanders fluidly connected to the at least one combustion chamber and at least one of the heat exchangers;
 at least one generator fluidly connected to at least one of the hot-gas expanders, the generator producing electric power; and a stream of liquid air and a stream of working loop fluid, the stream of liquid air and the stream of working loop fluid being separate and distinct streams, the working loop fluid traveling in a closed loop such that liquid air released from the storage apparatus flows in a first general direction, and working loop fluid flows in a second general direction, the second general direction being substantially opposite to the first general direction; and the working loop fluid warms the released liquid air such that the released liquid air is substantially vaporized, and the released liquid air cools the working loop fluid such that the working loop fluid is substantially liquefied.

2. The system of claim 1 wherein the working loop fluid is $CO_2$.

3. The system of claim 2 further comprising at least one cryogenic pump, wherein the substantially liquefied working loop $CO_2$ is pumped to pressure by the at least one cryogenic pump and vaporized by hot combustion gas in at least one of the heat exchangers; and the vaporized high pressure working loop $CO_2$ is expanded in a generator-loaded hot-gas expander.

4. The system of claim 3 further comprising at least one valve, wherein combustion gas is directed from the combustion chamber to at least one generator-loaded hot gas expander and expanded in the generator-loaded hot-gas expander;

the expanded combustion gas is split by the at least one valve into a first portion and a second portion, the first portion being relatively larger than the second portion;

the first portion is directed to a first heat exchanger; and the second portion is directed to a second heat exchanger such that the second portion heats and substantially vaporizes the released liquid air.

5. The system of claim 1 wherein the substantially vaporized air is directed to a combustion chamber and combusted with a fuel stream.

6. The system of claim 1 further comprising a liquid air production system, the liquid air production system comprising:

one or more inlet air compressors;

a molecular sieve assembly fluidly connected to a first inlet air compressor;

a vertical cold flue assembly fluidly connected to the molecular sieve assembly and to a second inlet air compressor, the vertical cold flue assembly having an air inlet at or near its top into which inlet air is directed and an exit at or near its bottom;

one or more inlet air heat exchangers including a main heat exchanger fluidly connected to at least one of the plurality of inlet air compressors;

a storage apparatus fluidly connected to the main heat exchanger;

an absorption chiller using a working fluid, the absorption chiller being fluidly connected to the cold flue assembly; and a mechanical chiller containing refrigerant fluid, the mechanical chiller being fluidly connected to the absorption chiller; and a refrigerant loop air assembly fluidly connected to the mechanical chiller.

7. The system of claim 6 wherein the refrigerant loop air assembly comprises:

one or more refrigerant loop air compressors, at least one of the plurality of refrigerant loop air compressors being fluidly connected to the main heat exchanger;

one or more refrigerant loop air cryogenic expanders;

wherein the mechanical chiller is fluidly connected to at least one refrigerant loop air compressor, at least one refrigerant loop air cryogenic expander, the absorption chiller, and to the main heat exchanger; and wherein refrigerant loop air flows from the refrigerant loop assembly to the main heat exchanger to cool the inlet air.

8. The system of claim 7 wherein the refrigerant loop air is compressed by the one or more refrigerant loop air compressors and the heat of compression is recovered by at least the absorption chiller.

9. The system of claim 8 further comprising at least one valve, wherein the refrigerant loop air is split by the at least one valve such that a first portion is directed to the mechanical chiller and a second portion is directed to at least one refrigerant loop air cryogenic expander;

the refrigerant loop air is cooled by the mechanical chiller and by the one or more refrigerant loop air cryogenic expanders and is directed to the main heat exchanger; and the refrigerant fluid within the mechanical chiller is condensed by cold working fluid sent to the mechanical chiller from the absorption chiller.

10. The system of claim 6 wherein recovered cold from a vapor portion of the substantially liquefied air further cools the inlet air in the main heat exchanger;

the vapor portion of the substantially liquefied air is warmed by heat from the inlet air and recovered heat of compression; and the warmed vapor portion of the substantially liquefied air is directed to the molecular sieve assembly such that the vapor portion of the substantially liquefied air removes carbon dioxide and moisture from the molecular sieve assembly.

11. The system of claim 6 wherein electric power is produced in two modes such that in the first mode the substantially liquefied working loop fluid is pumped to pressure and vaporized by hot combustion gas; and the vaporized high pressure working loop fluid is expanded in one of the generator-loaded hot-gas expander, wherein the generator produces electric power as a supplemental source of electric power; and in the second mode:

the substantially vaporized air is directed to a combustion chamber, combusted with a fuel stream and expanded in one of the generator-loaded hot-gas expanders.

12. A method of releasing stored power, comprising:

releasing stored liquid air;

pumping the released liquid air to pressure;

creating a closed loop containing working loop fluid such that the released liquid air and the working loop fluid are separate and distinct streams;

directing the released liquid air through at least one heat exchanger in a first general direction;

directing working loop fluid through the at least one heat exchanger such that the working loop fluid flows in a second general direction, the second general direction being substantially opposite to the first general direction;

warming the released liquid air with the working loop fluid such that the released liquid air is substantially vaporized; and cooling the working loop fluid with the released liquid air such that the working loop air is substantially liquefied.

13. The method of claim 12 wherein the working loop fluid is $CO_2$.

14. The method of claim 13 further comprising the steps of:
pumping the substantially liquefied working loop air to pressure;
vaporizing the pressurized liquid working loop $CO_2$ by heat exchange with hot combustion gas; and
expanding the pressurized working loop $CO_2$ in a generator-loaded hot-gas expander.

15. The method of claim 14 further comprising the steps of:
directing the formerly hot exhaust stream from the main heat exchanger to a moisture separator;
recovering moisture from the hot exhaust stream in the moisture separator;
pumping the recovered liquid moisture to pressure;
warming the moisture by recovered heat in a warm heat exchanger; and
directing the recovered moisture to the first generator-loaded hot-gas expander.

16. The method of claim 13 further comprising the steps of:
directing the substantially vaporized and pressurized air to a combustion chamber; and
combusting the substantially vaporized air with a fuel stream such that the substantially vaporized air produces electric power.

17. The method of claim 16 further comprising the steps of:
directing combustion gas from the combustion chamber to a first generator-loaded hot-gas expander; and
expanding the combustion gas in the at least one generator-loaded hot-gas expander.

18. The method of claim 17 further comprising the steps of:
splitting the expanded combustion gas into a first portion and a second portion, the first portion being relatively larger than the second portion;
directing the first portion to a main heat exchanger to warm a cold pressurized air stream;
directing the second portion to a second heat exchanger such that the second portion heats and substantially vaporizes the liquid air in the loop that is used to recover the cold from the main released air, where the loop $CO_2$ is heated and expanded in a second generator-loaded hot-gas expander.

19. A system for releasing power, comprising:
a storage apparatus;
one or more heat exchangers, at least one of the heat exchangers being fluidly connected to the storage apparatus;
at least one combustion chamber fluidly connected to at least one of the heat exchangers;
one or more generator-loaded hot-gas expanders fluidly connected to the at least one combustion chamber and at least one of the heat exchangers;
at least one generator fluidly connected to at least one of the hot-gas expanders, the generator producing electric power as a supplemental source of electric power; and
a stream of liquid air and a stream of working loop fluid, the stream of liquid air and the stream of working loop fluid being separate and distinct streams, the working loop fluid traveling in a closed loop such that liquid air released from the storage apparatus flows in a first general direction, and working loop fluid flows in a second general direction, the second general direction being substantially opposite to the first general direction; and
the working loop fluid warms the released liquid air such that the released liquid air is substantially vaporized, and the released liquid air cools the working loop fluid such that the working loop fluid is substantially liquefied;
wherein the substantially vaporized air is directed to the at least one combustion chamber, combusted with a fuel stream and expanded in one of the generator-loaded hot-gas expanders.

20. The system of claim 19 wherein the working loop fluid is $CO_2$.

* * * * *